(12) United States Patent
Kim et al.

(10) Patent No.: US 10,681,770 B2
(45) Date of Patent: Jun. 9, 2020

(54) METHOD FOR TRANSMITTING AND RECEIVING SIGNAL IN WIRELESS LAN SYSTEM AND APPARATUS THEREFOR

(71) Applicant: LG ELECTRONICS INC., Seoul (KR)

(72) Inventors: Jinmin Kim, Seoul (KR); Sungjin Park, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 16/093,606

(22) PCT Filed: Apr. 27, 2017

(86) PCT No.: PCT/KR2017/004508
§ 371 (c)(1),
(2) Date: Oct. 12, 2018

(87) PCT Pub. No.: WO2017/191936
PCT Pub. Date: Nov. 9, 2017

(65) Prior Publication Data
US 2019/0124720 A1     Apr. 25, 2019

Related U.S. Application Data (60) Provisional application No. 62/330,877, filed on May 3, 2016, provisional application No. 62/364,328, filed on Jul. 20, 2016.

(51) Int. Cl.
*H04W 72/04*   (2009.01)
*H04W 84/12*   (2009.01)
(Continued)

(52) U.S. Cl.
CPC .............. *H04W 84/12* (2013.01); *H04L 1/00* (2013.01); *H04L 1/0009* (2013.01);
(Continued)

(58) Field of Classification Search
CPC ....... H04L 1/00; H04L 1/0001; H04L 1/0009; H04L 27/2601; H04L 5/0005;
(Continued)

(56) References Cited

U.S. PATENT DOCUMENTS 10,172,119 B2 * 1/2019 Lunttila ................ H04L 5/0007
2012/0155447 A1 * 6/2012 Vermani ........... H04W 28/0215
370/338
(Continued)

FOREIGN PATENT DOCUMENTS

| WO | 2006132506 | 12/2006 |
|---|---|---|
| WO | 2015186887 | 12/2015 |
| WO | 2016021838 | 2/2016 |

OTHER PUBLICATIONS

PCT International Application No. PCT/KR2017/004508, Written Opinion of the International Searching Authority dated Aug. 9, 2017, 22 pages.
(Continued)

*Primary Examiner* — Robert J Lopata
(74) *Attorney, Agent, or Firm* — Lee, Hong, Degerman, Kang & Waimey (57) ABSTRACT

The present specification relates to a method for transmitting and receiving, by a station, a signal in a wireless LAN (WLAN) system. More particularly, the specification presents a method for transmitting a receiving a signal and an apparatus therefor by differently interpreting MCS information indicated by a plurality of modulation and coding scheme (MCS) fields according to a signal transmission and reception method, when the station transmits the signal on
(Continued)

the basis of the MCS information indicated by the plurality of MCS fields.

15 Claims, 7 Drawing Sheets

(51) Int. Cl.
  *H04L 1/00* (2006.01)
  *H04W 28/06* (2009.01)
  *H04L 5/00* (2006.01)
  *H04L 27/26* (2006.01)
  *H04W 74/00* (2009.01)
  *H04W 88/02* (2009.01)
  *H04W 88/10* (2009.01)

(52) U.S. Cl.
  CPC ........ *H04L 5/0005* (2013.01); *H04L 27/2601* (2013.01); *H04W 28/06* (2013.01); *H04W 72/0446* (2013.01); *H04W 74/002* (2013.01); *H04W 88/02* (2013.01); *H04W 88/10* (2013.01)

(58) Field of Classification Search
  CPC ............. H04W 28/06; H04W 72/0446; H04W 74/002; H04W 84/12; H04W 88/02; H04W 88/10
  USPC ........................................................ 370/310
  See application file for complete search history.

(56) References Cited

U.S. PATENT DOCUMENTS

| | | |
|---|---|---|
| 2013/0148625 A1 | 6/2013 | Kim et al. |
| 2014/0029547 A1 | 1/2014 | Seok |
| 2014/0328430 A1 | 11/2014 | Park et al. |
| 2015/0023291 A1 | 1/2015 | Lee et al. |
| 2015/0223163 A1 | 8/2015 | Sammour et al. |
| 2015/0319782 A1* | 11/2015 | Chu ...................... H04W 74/08 370/336 |
| 2016/0065327 A1* | 3/2016 | Asterjadhi ............ H04L 1/0028 370/329 |
| 2016/0309457 A1* | 10/2016 | Eitan ................. H04W 52/0203 |
| 2016/0330738 A1* | 11/2016 | Eitan ................... H04L 27/2602 |
| 2017/0070995 A1* | 3/2017 | Eitan ....................... H04L 5/001 |
| 2017/0134126 A1* | 5/2017 | Sanderovich ......... H04L 5/0044 |
| 2017/0265224 A1* | 9/2017 | Sanderovich ......... H04W 74/00 |
| 2018/0020374 A1* | 1/2018 | Kasher ................. H04L 1/0003 |

OTHER PUBLICATIONS

European Patent Office Application Serial No. 17792838.9, Search Report dated Nov. 21, 2019, 7 pages.

* cited by examiner

METHOD FOR TRANSMITTING AND RECEIVING SIGNAL IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2017/004508, filed on Apr. 27, 2017, which claims the benefit of U.S. Provisional Application Nos. 62/330,877, filed on May 3, 2016, and 62/364,328, filed on Jul. 20, 2016, the contents of which are all hereby incorporated by reference herein in their entireties.

TECHNICAL FIELD

Following description relates to a method of operating a station in a wireless LAN (WLAN) system. More particularly, when a station transmits and receives a signal based on MCS (Modulation and Coding Scheme) information indicated by a plurality of MCS fields in a WLAN system, the present invention relates to a method of transmitting and receiving the signal by differently interpreting the MCS information indicated by a plurality of the MCS fields and an apparatus therefor.

BACKGROUND ART

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Meanwhile, IEEE 802.11ad defines performance enhancement for high-speed throughput in the 60 GHz band, and IEEE 802.11ay, for introducing channel bonding and MIMO technology to IEEE 802.11ad systems for the first time, is being discussed.

DISCLOSURE OF THE INVENTION

Technical Task

In 11ay system to which the present invention is applicable, a station can transmit a signal using SU-MIMO (Single User—Multi Input Multi Output) transmission method by bonding a single channel or a plurality of channels. Or, the station can transmit a signal by aggregating a plurality of channels.

In particular, an object of the present invention is to provide a method for an 11ay UE (e.g., a PCP/AP or a station) transmitting a signal to provide a plurality of MCS (Modulation and Coding Scheme) fields to a reception 11ay UE and transmit and receive a signal based on a plurality of the MCS fields. In this case, MCS information indicated by a plurality of the MCS fields can be differently applied according to a signal transmission method.

Technical Solution

To achieve these and other advantages and in accordance with the purpose of the present invention, as embodied and broadly described, according to one embodiment, a method of transmitting a signal, which is transmitted by a first station (STA) to a second STA in a wireless local area network (WLAN) system, includes transmitting a header field including the 2*N (N is a natural number) number of MCS (Modulation and Coding Scheme) fields to the second STA, and transmitting a signal to the second STA based on MCS information indicated by the 2*N number of MCS fields. In this case, the MCS information indicated by the 2*N number of MCS fields can be differently interpreted according to a signal transmission method of the first STA.

To further achieve these and other advantages and in accordance with the purpose of the present invention, according to a different embodiment, a first station (STA) transmitting a signal in a wireless LAN (WLAN) system includes a transceiver configured to transceive a signal with a second STA with one or more RF (Radio Frequency) chains and a processor configured to process the signal transceived with the second STA in a manner of being connected with the transceiver, the processor configured to transmit a header field including the 2*N (N is a natural number) number of MCS (Modulation and Coding Scheme) fields to the second STA, the processor configured to transmit a signal to the second STA based on MCS information indicated by the 2*N number of MCS fields. In this case, the MCS information indicated by the 2*N number of MCS fields can be differently interpreted according to a signal transmission method of the first STA.

To further achieve these and other advantages and in accordance with the purpose of the present invention, according to a further different embodiment, a method of receiving a signal, which is received by a first station (STA) from a second STA in a wireless LAN (WLAN) system, includes receiving a header field including the 2*N (N is a natural number) number of MCS (Modulation and Coding Scheme) fields from the second STA, and receiving a signal from the second STA based on MCS information indicated by the 2*N number of MCS fields. In this case, the MCS information indicated by the 2*N number of MCS fields can be differently interpreted according to a signal transmission method of the first STA.

To further achieve these and other advantages and in accordance with the purpose of the present invention, according to a further different embodiment, a first station (STA) receiving a signal in a wireless LAN (WLAN) system includes a transceiver configured to transceive a signal with a second STA with one or more RF (Radio Frequency) chains and a processor configured to process the signal transceived with the second STA in a manner of being connected with the transceiver, the processor configured to receive a header field including the 2*N (N is a natural number) number of MCS (Modulation and Coding Scheme) fields from the second STA, the processor configured to receive a signal from the second STA based on MCS information indicated by the 2*N number of MCS fields. In this case, the MCS information indicated by the 2*N number of MCS fields can be differently interpreted according to a signal transmission method of the first STA.

In this case, the signal transmission method of the first STA can include SU-MIMO (Single User—Multi input Multi output) transmission using a single channel or channel bonding, or channel aggregation transmission.

For example, if the signal transmission method of the first STA corresponds to the SU-MIMO transmission using the single channel or the channel bonding, the MCS information indicated by the 2*N number of MCS fields can be interpreted as MCS information applied to the single channel or streams of the channel-bonded channels.

As a different example, if the signal transmission method of the first STA corresponds to the channel aggregation transmission, MCS information indicated by the N number of MCS fields among the 2*N number of MCS fields is interpreted as MCS information applied to streams of a channel 1 among the channel-bonded channels and MCS information indicated by the remaining N number of MCS fields among the 2*N number of MCS fields can be interpreted as MCS information applied to streams of a channel 2 among the channel-bonded channels.

In this case, the header field can further include a field indicating the number of streams.

In this case, the field indicating the number of streams may have a size of 3 bits.

The field indicating the number of streams included in the header field can be positioned prior to the 2*N number of MCS fields in a bit dimension.

The header field can be transmitted via a PPDU (Physical protocol Data Unit).

In this case, the header field can further include an SU/MU field indicating whether the PPDU corresponds to an SU (Single-User) PPDU or an MU (Multi-user) PPDU, a primary channel field indicating a primary channel, a beamforming field indicating whether or not beamforming is performed, and a CRC (Cyclic Redundancy Check) of a size of 16 bits.

Advantageous Effects

According to the configuration above, a station according to the present invention can transmit and receive a signal by flexibly applying MCS information indicated by a plurality of MCS fields according to a signal transmission/reception method.

In particular, according to the present invention, it is able to utilize an MCS field utilized for a different transmission method (e.g., SU-MIMO transmission performed by bonding a signal channel or a plurality of channels) without adding an additional field for indicating MCS information according to a channel for channel aggregation transmission.

The effects that may be obtained by the present invention are not limited to the above-mentioned effects, and other effects not mentioned above will be clearly understood by those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Mode for Invention

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

1. Wireless LAN (WLAN) System 1-1. Generals of WLAN System

Figure 1:
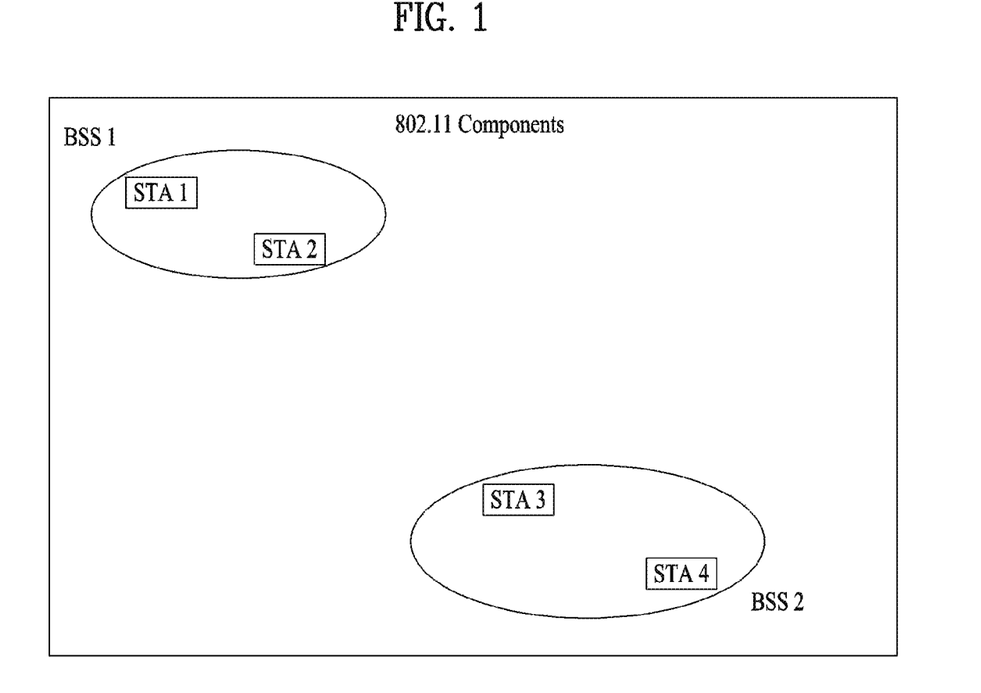
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
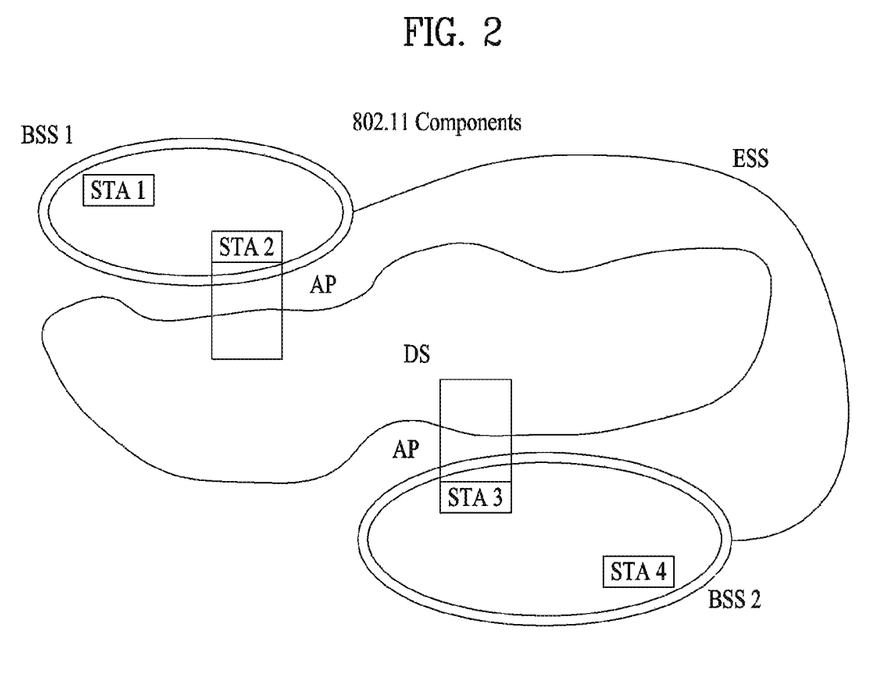
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1-2. Channel Bonding in WLAN System

Figure 3:
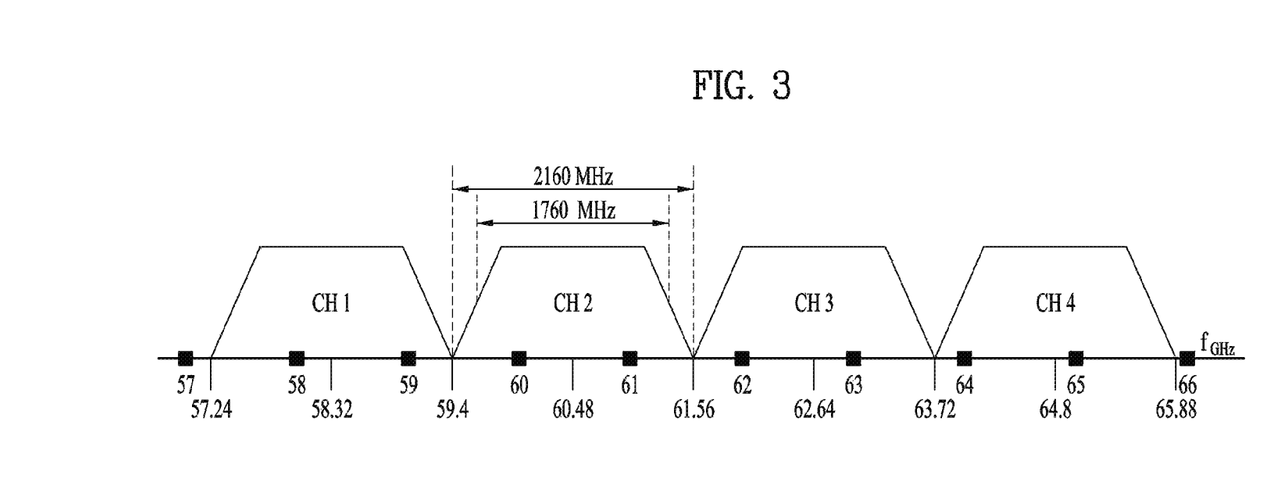
FIG. 3 is a diagram illustrating a channel in a 60 GHz band for explaining a channel bonding operation according to an embodiment of the present invention.

FIG. 3 is a diagram illustrating a channel in a 60 GHz band for explaining a channel bonding operation according to an embodiment of the present invention.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the present invention is not limited to a specific channel.

Figure 4:
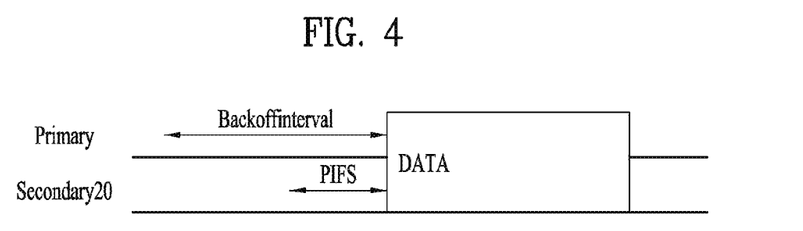
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present invention, an AP may transmit scheduling information to STAs to perform access based on scheduling. Meanwhile, in another aspect of the present invention, channel access may be performed based on the above-described scheduling or on contention independently of the above-described scheduling. In yet another aspect of the present invention, communication may be performed based on beamforming using a spatial sharing technique.

1-3. Beacon Interval Configuration

Figure 5:
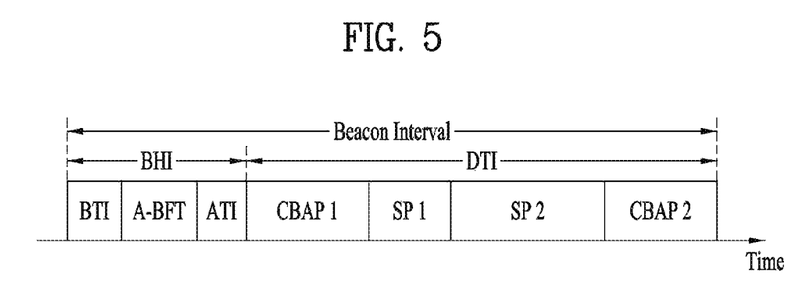
FIG. 5 is a diagram illustrating configuration of a beacon interval.

FIG. 5 is a diagram illustrating configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 4.

The BTI refers to an interval during which one or more DMG beacon frames may be transmitted. The A-BFT interval refers to an interval during which beamforming training is performed by an STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present invention is applied will be described in detail.

1-4. Physical Layer Configuration

It is assumed that the following three different modulation modes may be provided in the WLAN system according to an embodiment of the present invention.

TABLE 1

| PHY | MCS | Note |
| --- | --- | --- |
| Control PHY | 0 | |
| Single carrier PHY | 1 ... 12 | (low power SC PHY) |
| (SC PHY) | 25 ... 31 | |
| OFDM PHY | 13 ... 24 | | such modulation modes may be used to satisfy different requirements (e.g., high throughput or stability). Depending on the system, only some of these modes may be supported.

Figure 6:
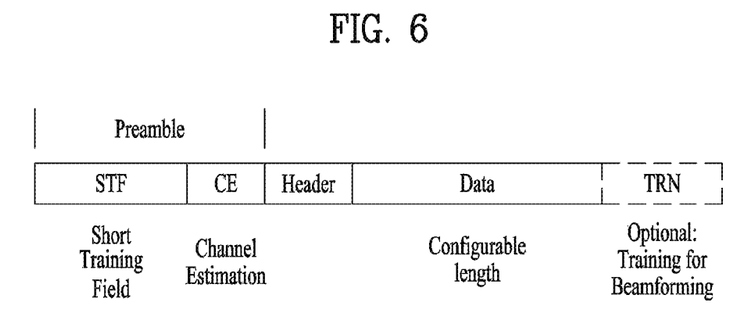
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
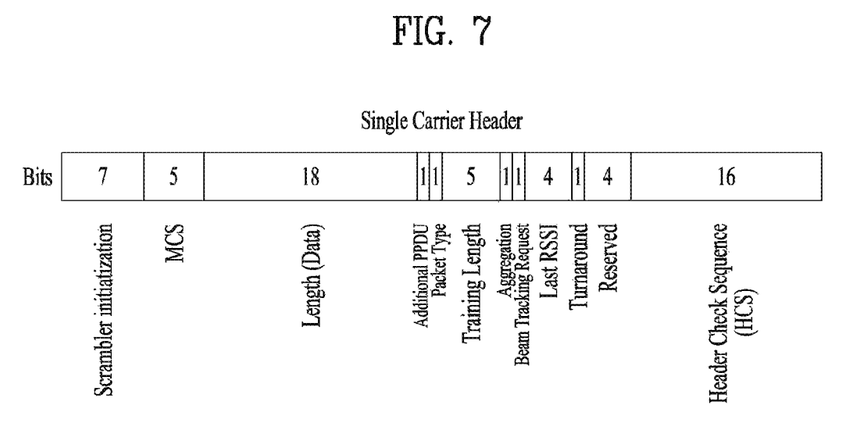
FIGS. 7 and 8 are diagrams illustrating configuration of the header field of the radio frame of FIG. 6.
Figure 8:
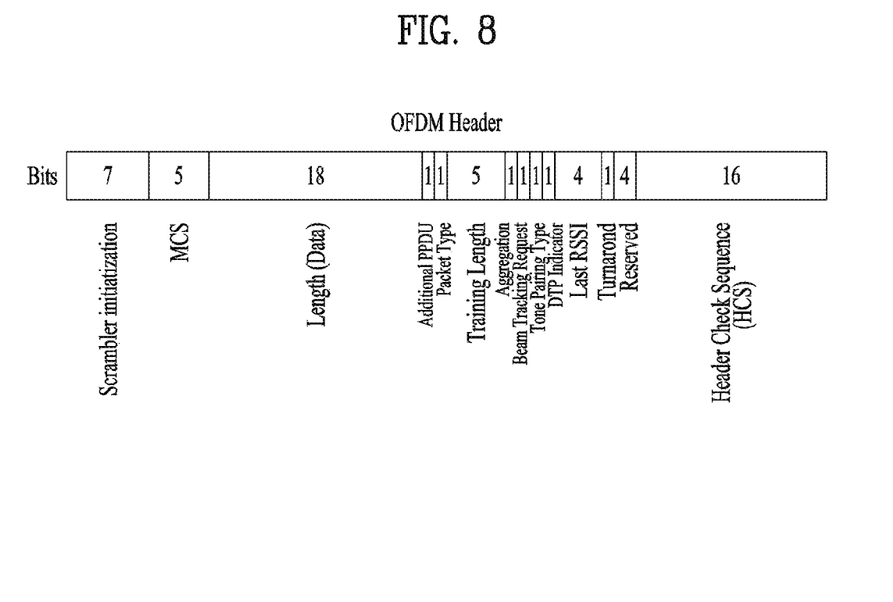

FIGS. 7 and 8 are diagrams illustrating configuration of the header field of the radio frame of FIG. 6.

Specifically, FIG. 7 illustrates a case where an Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam tracking request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam tracking request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for a 11ay UE following a legacy header field may be defined, and channel bonding and MIMO may be supported through the newly defined field.

Figure 9:
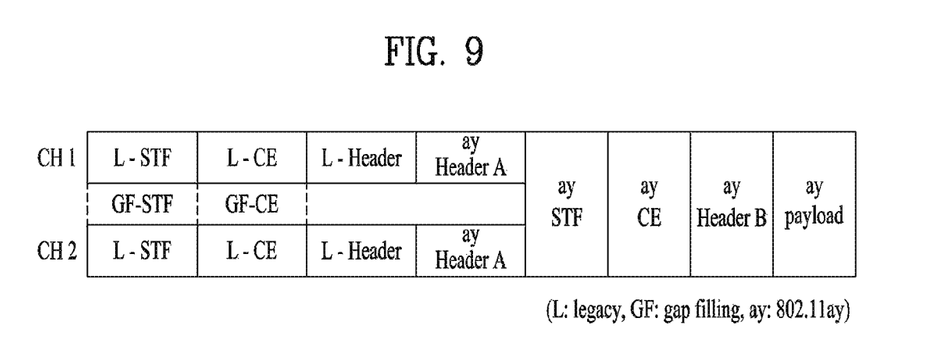
FIG. 9 is a diagram showing a PPDU structure applicable to the present invention.

FIG. 9 is a diagram showing a PPDU structure according to a preferred embodiment of the present invention. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present invention, transmitting the new STF and CE field (gap filling) preamble through the 400 MHz band between the channels along with transmission of the legacy preamble may be considered.

In this case, as shown in FIG. 9, in the PPDU structure according to the present invention, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or "ay header" and "EDMG header" may be interchangeably used.

For example, a total of six channels (2.16 GHz) may be present in 11ay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B are transmitted in a wideband after the legacy preamble, legacy header, and ay header A, without the GF-STF and GF-CE field indicated by the dotted line in FIG. 9.

Figure 10:
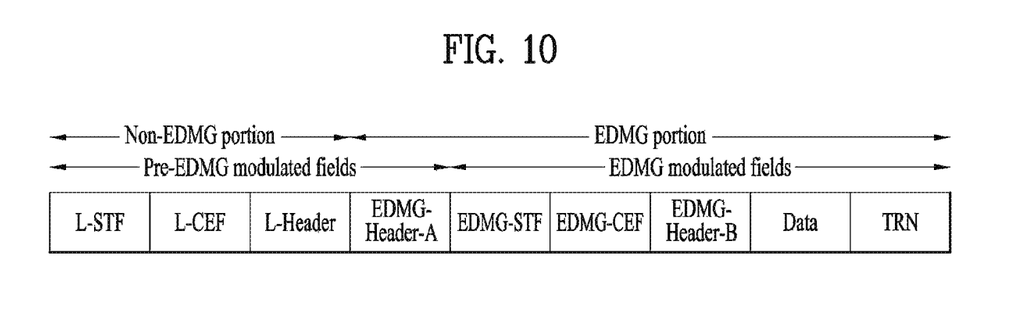
FIG. 10 is a diagram showing a PPDU structure applicable to the present invention.

FIG. 10 is a diagram showing a PPDU structure applicable to the present invention. The aforementioned PPDU format can be simply summarized as FIG. 10.

As shown in FIG. 10, a PPDU format applicable to 11ay system can include L-STF, L-CEF, L-Header, EDMG-Header-A, EDMG-STF, EDMG-CEF, EDMG-Header-B, Data, and TRN fields. The fields above can be selectively included according to a form (e.g., SU PPDU, MU PPDU, etc.) of a PPDU.

In this case, a portion including the L-STF, the L-CEF, and the L-header fields can be referred to as a non-EDMG portion and the remaining part can be referred to as an EDMG portion. And, the L-STF, the L-CEF, the L-header, and the EDMG-Header A fields can be referred to as pre-EDMG modulated fields and the remaining part can be referred to as EDMG modulated fields.

2. PHY Header Configuration Proposed by the Present Invention

In the following, a configuration of a PHY header (e.g., L-Header and/or (EDMG) Header-A) capable of being applied to support MIMO and channel bonding in 11ay system to which the present invention is applicable is proposed.

2.1 Configuration of L-Header or DMG Header

In the present chapter, contents capable of being included in the L-Header field shown in FIG. 10 are explained in detail.

A DMG header of 11ad system includes a reserved bit of a size of 4 bits in total. In 11ay system to which the present invention is applicable, information described in the following can be transmitted to STAs via the reserved bits.

EDMG (Header-A) indicator (1 bit)
MCS extension of DMG SC (1 bit)
SC/OFDM indicator (1 bit)
SU/MU indicator (1 bit)

In particular, in the aspect of a receiver, the receiver may have preparation time to sufficiently measure a channel according to (SC/OFDM) modulation. If EDMG STF is differently designed according to modulation, it is preferable to indicate SC/OFDM indication information via L-Header field.

The SU/MU indicator can be transmitted via the L-Header field or EDMG Header-A field described in the following. Hence, the SU/MU indicator is described later.

2.2 EDMG Header-A Format

In the present chapter, a format applicable to the EDMG Header-A field shown in FIG. 10 is explained in detail.

The EDMG Header-A field according to the present invention can be configured by 2 symbols rather than 1 symbol. This is because, in order to support a new characteristic (e.g., MIMO, channel bonding, etc.) supported by 11ay system, 1 symbol length is insufficient and it is necessary to more strongly protect the EDMG Header-A field compared to a data coding rate. (For example, in case of using QPSK modulation scheme, it is necessary to consider I/Q imbalance.)

In particular, in order to accommodate a new characteristic and have high protectiveness, according to the present invention, the EDMG Header-A field can be configured by a length of 2 symbols.

In this case, essential information (e.g., BW, number of EDMG CESs, CP length, etc.) can be configured to be preferentially decoded prior to other information (e.g., MCS). To this end, the essential information can be included in a preceding symbol among 2 symbols. An STA may have sufficient preparation time for interpreting a PPDU format by decoding the EDMG Header-A field.

And, 1 or 2 CRCs (Cyclic Redundancy Check) can be applied. In this case, if 2 CRCs are applied, each of the CRCs can be applied according to each symbol of the EDMG Header-A field.

And, the EDMG Header-A field can be transmitted by coding rate different from a coding rate for transmitting the aforementioned L-Header field. For example, if the EDMG Header-A field includes a lot of reserved bits, the EDMG Header-A field can be robustly transmitted with a coding rate lower than a coding rate of 3/4 LDPC (Low Density parity Check) scheme for L-Header (11 ad Header).

2.3 Contents of EDMG Header-A

SU-MIMO and channel boding capable of being supported by 11ay system to which the present invention is applicable are explained before contents capable of being included in the EDMG Header-A field of FIG. 10 are explained in detail. The contents capable of being included in the EDMG Header-A field to support the SU-MIMO and the channel bonding are explained in detail.

(1) SU-MIMO

First of all, the 11ay system to which the present invention is applicable supports maximum 8 streams. The 11ay system according to the present invention can apply a different MCS according to each stream.

If a different MCS is applied to each stream, it may have a merit in that it is able to improve a link throughput. However, since it is necessary to have encoders/decoders as many as the number of coding rates different from each other, it may have a demerit in that hardware complexity increases and signaling overhead for performing feedback according to a stream increases.

Hence, the present invention proposes a method of applying the same MCS to one or more streams instead of a method of applying a different MCS to each stream. For example, if the number of applicable MCSs different from each other is restricted to maximum 2 or 4, one or more streams may have the same MCS. In other word, when the 11ay system supports 8 streams, according to the present invention, if the number of MCSs applicable to the 8 streams is restricted to maximum 2 or 4, a part of streams among the 8 streams may have the same MCS.

(2) Channel Aggregation (or Channel Bonding)

The 11ay system to which the present invention is applicable supports channel aggregation or channel bonding. Since the 11ay system according to the present invention supports the channel aggregation, although a specific STA has no capability capable of performing wide bandwidth channel bonding, it may be able to make the specific STA support 2-channel aggregation by more using hardware of a legacy DMG device, thereby easily increasing throughput. In particular, the channel aggregation has a characteristic capable of inducing performance similar to performance of channel bonding with low cost or low complexity.

In the foregoing description, although the 2-channel aggregation has been explained as an example, the 11ay system to which the present invention is applicable can support 3 or 4-channel aggregation as well. In particular, an STA can perform 3-channel aggregation or 4-channel aggregation by using 3 or 4 hardware of a legacy DMG device. In the present invention, although the 2-channel aggregation is explained only to emphasize an object of the channel aggregation, the configuration of the present invention is not limited by the 2-channel aggregation.

When an STA duplicately uses a DMG device or a modem or uses a plurality of DMG devices or modems to implement the channel aggregation, each of the DMG devices or modems can perform independent encoding/decoding on data without additional hardware complexity. In particular, when channel aggregation is used, the present invention proposes a method of additionally indicating an MCS for the channel aggregation.

The channel aggregation proposed by the present invention includes not only aggregation of contiguous channels but also aggregation of non-contiguous channels. If the 11ay system according to the present invention supports the aggregation of non-contiguous channels, link quality for each of the non-contiguous channels may considerably vary. In this case, it is preferable to assign a different MCS to each of the non-contiguous channels. In particular, according to the present invention, when channels are aggregated, an MCS for each channel is additionally configured to make an STA to efficiently perform link adaptation.

Based on the aforementioned items, according to the present invention, contents described in the following can be included in the EDMG Header-A field.

MCS according to stream

Allocating a different MCS according to a stream requires high complexity in the aspect of signaling, channel state feedback, and MIMO decoding. When the complexity is considered, the maximum number of MCSs capable of being supported by 11ay system to which the present invention is applicable may correspond to 2 and each of the MCSs can be allocated to one or more streams.

MCS according to channel when channels are aggregated

Meanwhile, when channels are aggregated, a bit value corresponding to an MCS for a secondary channel can be used for channel bonding, a different usage for a single channel operation, or reserved bits.

BSS color (BSS ID)

Additionally, according to the present invention, BSS color (BSS ID) information can be included in the EDMG Header-A field. Hence, in case of utilizing BSS color, an STA is able to perform early decoding termination for power saving.

For example, when an STA receives a PPDU, if the PPDU is not a PPDU for a BSS to which the STA belongs thereto, the STA can terminate the PPDU decoding. In case of considering an NAV (Network Allocation Vector) section without decoding a MAC header, a TXOP (Transmission Opportunity) field can be included in the EDMG Header-A field.

2.4. Example of Configuring EDMG Header-A

The EDMG Header-A proposed by the present invention can be variously configured according to embodiments described in the following based on the aforementioned contents.

TABLE 2

| Field name | Start bit | Num. of bits | Description |
|---|---|---|---|
| Bandwidth | 0 | 6 | Set to the indexing value corresponding to a specific bandwidth type (2.16, 4.32, 6.48, 8.64, 2.16 + 2.16 GHz) and a specific primary channel allocation [1] |
| SU/MU | 6 | 2 | Indicates whether the PPDU is sent SU or MU-MIMO or OFDMA |
| BSS color | 8 | (6) TBD | The BSS Color field is an identifier of the BSS |
| Num. of stream | 14 | 3 | Indicates the number of spatial streams: |
| CP length | 17 | 2 | 0 - Normal GI/CP, 1 - Short GI/CP 2 - Long GI/CP, 3 - Reserved |
| Beamformed | 19 | 1 | If set to 1, indicates that per-carrier beamforming is used. Otherwise, set to 0. |
| STBC | 20 | 1 | Set to 1 if space time block coding is used and set to 0 otherwise |
| PSDU length | 21 | 22 | Indicates the length of the EDMG PSDU in octets. |
| (CRC) | 43 | (16) | TBD; CRC for Header A1 |
| Reserved | 59 | 5 | |
| Total | | 64 | |

For example, as shown in Table 2, the EDMG Header-A field according to the present invention can include a BSS color field, and the like.

TABLE 3

| Field name | Start bit | Num. of bits | Description |
|---|---|---|---|
| MCS1 | 0 | 6 | Contains an EDMG MCS index 1 used for spatial streams |
| MCS2 | 6 | 6 | Contains an EDMG MCS index 2 used for spatial streams |
| MCS1 in channel aggregation | 12 | 6 | When channel aggregation is used, Contains an EDMG MCS index 1 of secondary channel. The field is reserved when channel aggregation is not used |
| MCS2 in channel aggregation | 18 | 6 | When channel aggregation is used, Contains an EDMG MCS index 2 of secondary channel. The field is reserved when channel aggregation is not used |
| CRC | 24 | 16 | |
| Reserved | 40 | 24 | |
| Total | | 64 | |

As a different example, as shown in Table 3, the EDMG Header-A field according to the present invention can include an MCS1 field and an MCS2 field to indicate MCS allocated to a plurality of streams.

The EDMG Header-A field can include an MCS1 in channel aggregation field and an MCS2 in channel aggregation field to indicate MCS for two channels when channel aggregation is used. In this case, if channel aggregation is not used, the fields used for the channel aggregation can be reserved.

TABLE 4

| Field name | Start bit | Num. of bits | Description |
|---|---|---|---|
| SU/MU | 0 | 1 | Indicates whether the PPDU is sent SU or MU |
| BW Primary channel | | 6(TBD) | |
| GI/CP length | | 2 | 0 - Normal GI/CP, 1 - ShortGI/CP 2 - Long GI/CP, 3 - Reserved |
| PSDU length | | 22 | Indicates the length of the EDMG PSDU in octets. |
| Beamformed | | 1 | If set to 1, indicates that per-carrier beamforming is used. Otherwise, set to 0. |
| Short/Long LDPC | | 1 | 0 - 672 codeword. 1 - 1344codeword |
| Num. of SS | | 3(TBD) | Indicates the number of spatial streams |
| MCS | | 12(TBD) | Contains an EDMG MCS index used for spatial streams. We assumed there are 2 different MCSs for SU-MIMO. |
| Secondary channel MCS | | 12(TBD) | When channel aggregation is used, contains an EDMG MCS index of secondary channel. We assumed there are 2 different MCSs for SU-MIMO in secondary channel. The field can be used for other purposes when BW field does not indicate channel aggregation |
| CRC | | 16 | |
| Reserved | | 36 | |
| total | | 112 | |

As a further different example, as shown in Table 4, the EDMG Header-A field can include an MCS field. The MCS field can indicate MCS information on streams in a SU-MIMO situation. In the example of Table 4, assume that an MCS is configured by a size of 6 bits and the maximum number of MCS types capable of being supported in SU-MIMO situation corresponds to 2.

Subsequently, the EDMG Header-A field according to the present invention can include a secondary channel MCS field and the secondary channel MCS field can indicate MCS information on a secondary channel when channel aggregation is performed. In this case, in the example of Table 4, assume that an MCS is configured by a size of 6 bits and the maximum number of MCS types capable of being supported in a channel aggregation situation corresponds to 2.

Meanwhile, as mentioned in the foregoing description, since a main purpose of the channel aggregation is to reduce hardware complexity and increase efficiency, an STA performing the channel aggregation may correspond to a terminal of low specification having low capability. Table 5 in the following proposes a configuration of the EDMG Header-A field configured by combining the proposed methods for MIMO and the channel aggregation.

TABLE 5

| Field name | Start bit | Num. of bits | Description |
|---|---|---|---|
| SU/MU | 0 | 1 | Indicates whether the PPDU is sent SU or MU |
| BW Primary channel | | 6(TBD) | |
| GI/CP length | | 2 | 0 Normal GI/CP, 1 Short GI/CP 2 Long GI/CP, 3 Reserved |
| PSDU length | | 22 | Indicates the length of the EDMG PSDU in octets. |
| Beamformed | | 1 | If set to 1, indicates that per-carrier beamforming is used. Otherwise, set to 0. |

TABLE 5-continued

| Field name | Start bit | Num. of bits | Description |
|---|---|---|---|
| Short/Long LDPC | | 1 | 0 672 codeword, 1 1344codeword |
| Num. of SS | | 3(TBD) | Indicates the number of spatial streams |
| MCS | | 6(TBD) | Contains an EDMG MCS index used for spatial streams. |
| Second MCS | | 6(TBD) | When channel aggregation is used, contains an EDMG MCS index of secondary channel. When channel aggregation is not used, contains an EDMG MCS index used for spatial streams for SU-MIMO |
| CRC | | 16 | |
| Reserved | 48 | | |
| total | | 112 | |

As a further different example, Table 5 proposes a structure including an MCS field and a Second MCS field by combining the proposed methods for MIMO and the channel aggregation.

In this case, the MCS field indicates information on a first MCS set for SU-MIMO.

The Second MCS field can be differently interpreted depending on whether BW information transmits a corresponding PPDU by channel bonding or not. For example, if transmission of a PPDU corresponds to SU-MIMO transmission using a single channel or SU-MIMO transmission using channel bonding, it can be interpreted as the Second MCS field indicates MCS (set) information on a part of streams. As a different example, if transmission of a PPDU corresponds to channel aggregation transmission, it can be interpreted as the Second MCS field indicates MCS information on a secondary channel.

In particular, when SU-MIMO is performed by channel aggregation, streams of each channel have the same MCS information. MCS information on all streams of a primary channel is indicated by the MCS field and information on all streams of a secondary channel can be indicated by the Second MCS field.

Although Table 5 illustrates the EDMG Header-A configuration that the maximum number of MCS information is restricted to 2 irrespective of whether or not SU-MIMO or channel aggregation is performed, it is apparent that it is able to extend the maximum number of MCS information to 4 according to the present invention. In this case, when a PPDU is transmitted by channel aggregation, the maximum number of MCS capable of being allocated according to a channel may correspond to 2.

The aforementioned contents can be generalized as follows. A transmission STA according to the present invention transmits a header field including the 2*N (N is a natural number) number of MCS fields to a reception STA and can transmit a signal to the reception STA based on MCS information indicated by the 2*N number of MCS fields. In this case, the MCS information indicated by the 2*N number of MCS fields can be differently interpreted according to a signal transmission method of the transmission STA.

In this case, the signal transmission method of the transmission STA can include SU-MIMO (Single User—Multi input Multi output) transmission using a single channel or channel bonding or channel aggregation transmission.

For example, if the signal transmission method of the transmission STA corresponds to the SU-MIMO transmission using a single channel or channel bonding, the MCS information indicated by the 2*N number of MCS fields can be interpreted as MCS information applied to the single channel or streams of the channel bonded channels.

As a different example, if the signal transmission method of the transmission STA corresponds to the channel aggregation transmission, MCS information indicated by the N number of MCS fields among the 2*N number of MCS fields is interpreted as MCS information applied to streams of a channel 1 among the channel bonded channels and MCS information indicated by the remaining N number of MCS fields among the 2*N number of MCS fields can be interpreted as MCS information applied to streams of a channel 2 among the channel bonded channels.

As mentioned in the foregoing description, the EDMG Header-A field included in a PPDU can include various fields. For example, as shown in Table 3, an MCS field can be included in the EDMG Header-A field. As shown in Table 5, besides the MCS field, the EDMG Header-A field can further include an SU/MU field indicating whether the PPDU corresponds to an SU (Single-User) PPDU or an MU (Multi-user) PPDU, a primary channel field indicating a primary channel, a beamforming field indicating whether or not beamforming is performed, and a CRC (Cyclic Redundancy Check) of a size of 16 bits.

And, as shown in Table 5, a field indicating the number of streams can be positioned prior to the MCS field. In other word, the field indicating the number of streams can be positioned prior to a plurality of the MCS fields in a bit dimension.

If the EDMG Header-A field is configured according to the method above, a station according to the present invention transmits a PPDU including the EDMG Header-A field to a different station and can transmit a signal to the different station based on MCS information indicated by the MCS field included in the EDMG Header-A field. The different station receives the PPDU including the EDMG Header-A field and can receive the signal from the station based on the MCS information indicated by the MCS field included in the EDMG Header-A field. In this case, the MCS information indicated by the MCS field can be differently interpreted according to a method of actually transmitting a signal.

3. Device Configuration

Figure 11:
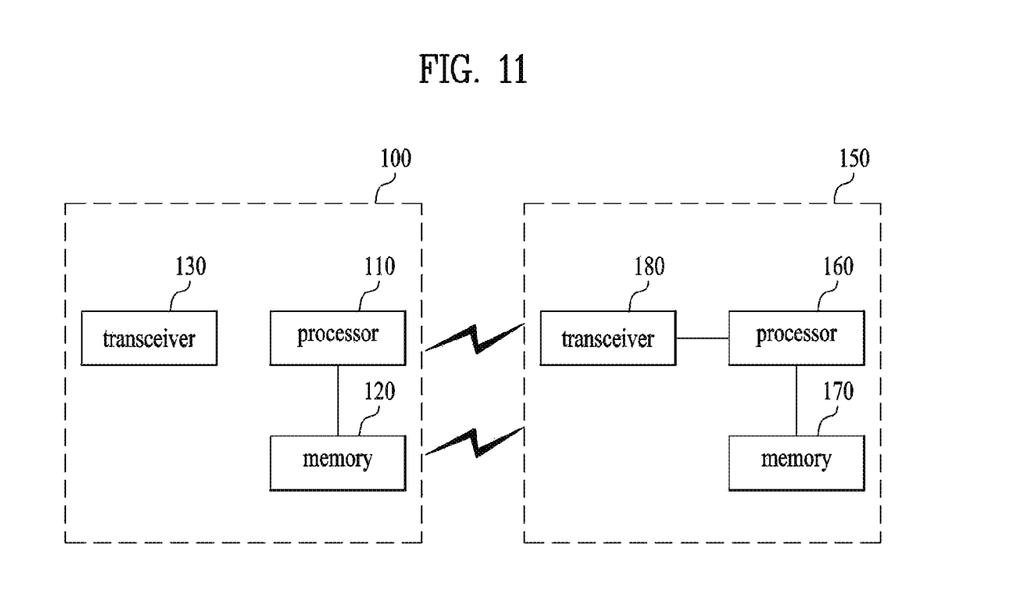
FIG. 11 is a diagram for explaining devices for implementing the aforementioned method.

FIG. 11 is a diagram illustrating devices for implementing the above-described method.

In FIG. 11, a wireless device 100 may correspond to a station configured to transmit a signal using the aforementioned EDMG Header-A field in the foregoing description and a wireless device 150 may correspond to a station configured to receive a signal using the aforementioned EDMG Header-A field in the foregoing description. In this case, each of the stations may correspond to an 11ay UE or a PCP/AC. In the following description, for clarity, a station transmitting a signal is referred to as a transmitting device 100 and a station receiving a signal is referred to as a receiving device 150.

The transmitting device 100 may include a processor 110, a memory 120 and a transceiver 130. The receiving device 150 may include a processor 160, a memory 170, and a transceiver 180. The transceivers 130 and 180 may transmit/receive wireless signals and may be implemented in a physical layer such as IEEE 802.11/3GPP. The processors 110 and 160 are implemented in the physical layer and/or MAC layer and are connected to the transceivers 130 and 180. The processors 110 and 160 may perform the UL MU scheduling procedure described above.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120,170 and executed by the processor 110,160. The memory 120, 170 may be located inside or outside the processor 110, 160 and may be connected to the processor 110, 160 by a well-known means.

The detailed description of preferred embodiments of the invention set forth above is provided to enable those skilled in the art to implement and practice the invention. Although the present invention has been fully described by way of example with reference to the accompanying drawings, it is to be understood that various modifications and changes may be made in the invention without departing from the scope and spirit of the invention. Accordingly, the present invention is not intended to be limited to the embodiments disclosed herein but is to be accorded the widest scope consistent with the principles and novel features disclosed herein.

INDUSTRIAL APPLICABILITY

Although it is explained that the present invention is applied to IEEE 802.11 based wireless LAN system, by which the present invention may be non-limited. The present invention can be applied to various wireless systems capable of performing data transmission based on channel bonding using the same method.

What is claimed is:

1. A method of receiving a signal by a first station (STA) from a second STA in a wireless local area network (WLAN) system, the method comprising:
   receiving a header field comprising 2*N Modulation and Coding Scheme (MCS) information for spatial streams from the second STA, wherein N is a natural number; and
   receiving the signal from the second STA based on the 2*N MCS information for spatial streams,
   wherein when the first STA receives the signal based on a channel aggregation transmission, the signal is received based on first N MCS information among the 2*N MCS information via a first aggregated channel and remaining N MCS information among the 2*N MCS information via a second aggregated channel.

2. The method of claim 1, wherein when the signal is received based on the channel aggregation transmission, the first N MCS information is applied to streams of the first aggregated channel and the remaining MCS information is applied to streams of the second aggregated channel.

3. The method of claim 1, wherein the header field further comprises a field for a number of streams, and
   wherein the field for the number of streams has a size of 3 bits.

4. The method of claim 3, wherein the field for the number of streams contained in the header field is positioned prior to a field for the 2*N MCS information in a bit dimension.

5. The method of claim 1, wherein the header field is transmitted via a Physical protocol Data Unit (PPDU).

6. A communication device for transmitting a signal in a wireless local area network (WLAN) system, the communication device comprising:
   a memory; and
   a processor operably coupled with the memory and configured to
   transmit a header field comprising 2*N Modulation and Coding Scheme (MCS) information for spatial streams to a different communication device, wherein N is a natural number, and
   transmit the signal to the different communication device based on the 2*N MCS information,
   wherein when the processor is configured to transmit the signal based on a channel aggregation transmission, the signal is transmitted based on first N MCS information among the 2*N MCS information via a first aggregated channel and remaining N MCS information among the 2*N MCS information via a second aggregated channel.

7. A communication device for receiving a signal in a wireless local area network (WLAN) system, the communication device comprising:
   a memory; and
   a processor operably coupled to the memory and configured to
   receive a header field comprising 2*N Modulation and Coding Scheme (MCS) information for spatial streams from a different communication device, and
   receive the signal from the different communication device based on the 2*N MCS information for spatial streams,
   wherein when the processor is configured to receive the signal based on a channel aggregation transmission, the signal is received based on first N MCS information among the 2*N MCS information via a first aggregated channel and remaining N MCS information among the 2*N MCS information via a second.

8. The communication device of claim 6, wherein when the signal is transmitted based on the channel aggregation transmission, the first N MCS information is applied to streams of the first aggregated channel and the remaining N MCS information is applied to streams of the second aggregated channel.

9. The communication device of claim 6, wherein the header field further comprises a field for a number of streams, and
   wherein the field for the number of streams has a size of 3 bits.

10. The communication device of claim 6, wherein the field for the number of streams contained in the header field is positioned prior to a field for the 2*N MCS information in a bit dimension.

11. The communication device of claim 6, wherein the header field is transmitted via a Physical protocol Data Unit (PPDU).

12. The communication device of claim 7, wherein when the signal is received based on the channel aggregation transmission, the first N MCS information is applied to streams of the first aggregated channel and the remaining N MCS information is applied to streams of the second aggregated channel.

13. The communication device of claim 7, wherein the header field further comprises a field for a number of streams, and
   wherein the field for the number of streams has a size of 3 bits.

14. The communication device of claim 7, wherein the field for the number of streams contained in the header field is positioned prior to a field for the 2*N MCS information in a bit dimension.

15. The communication device of claim 7, wherein the header field is transmitted via a Physical protocol Data Unit (PPDU).

* * * * *